July 5, 1960 R. W. HAGGAR 2,943,410
COMBINED FILING CABINET AND VIEWING ARRANGEMENT
FOR PHOTOGRAPHIC TRANSPARENCIES
Filed Dec. 13, 1956 2 Sheets-Sheet 1

Inventor
Robert W. Haggar
By~ Stephen J. Rudy
Att'y

July 5, 1960 R. W. HAGGAR 2,943,410
COMBINED FILING CABINET AND VIEWING ARRANGEMENT
FOR PHOTOGRAPHIC TRANSPARENCIES
Filed Dec. 13, 1956 2 Sheets-Sheet 2

Inventor
Robert W. Haggar
By~ Stephen J. Rudy
Att'y

United States Patent Office 2,943,410
Patented July 5, 1960

2,943,410

COMBINED FILING CABINET AND VIEWING ARRANGEMENT FOR PHOTOGRAPHIC TRANSPARENCIES

Robert W. Haggar, 211 Garside Ave. South, Hamilton, Ontario, Canada

Filed Dec. 13, 1956, Ser. No. 628,195

2 Claims. (Cl. 40—106.1)

This invention relates to a combined filing cabinet and viewing arrangement for photographic transparencies and the purpose of the invention is to provide a device particularly designed for use in medical clinics, hospitals and the like wherein it is modern practice to maintain photographic histories of surgical patients, the device being an improvement over the general practice of removing the individual transparencies from a storage container, loading them into a projector and afterwards returning them to storage. This takes time and transparencies can and do get mixed up in handling.

The object of this invention is to overcome the inadequacies of the present general method of handling and viewing transparencies through the provision of a combined cabinet and illuminated viewing screen and wherein a plurality of frames each containing a plurality of transparencies are normally stored in the cabinet and within the front portion of which the viewing screen is normally supported, it being merely necessary for the operator to remove the required frame from the cabinet and place it in front of the illuminated screen for viewing, a transparency magnifier being adjustably arranged in front of the screen for positioning in front of any desired transparency.

A further object of the invention is to provide the viewing arrangement in the form of a box-like casing having a translucent side and also within which the light source is contained, the general assembly being such that the casing normally rests at an inclination against the front face of the cabinet with its inclined translucent side outermost and against which the transparency containing frames rest for viewing.

With the foregoing and other objects in view as shall appear my invention consists of a filing cabinet and transparency viewing arrangement all as hereinafter more particularly described and illustrated in the accompanying drawings in which.

Figure 1:
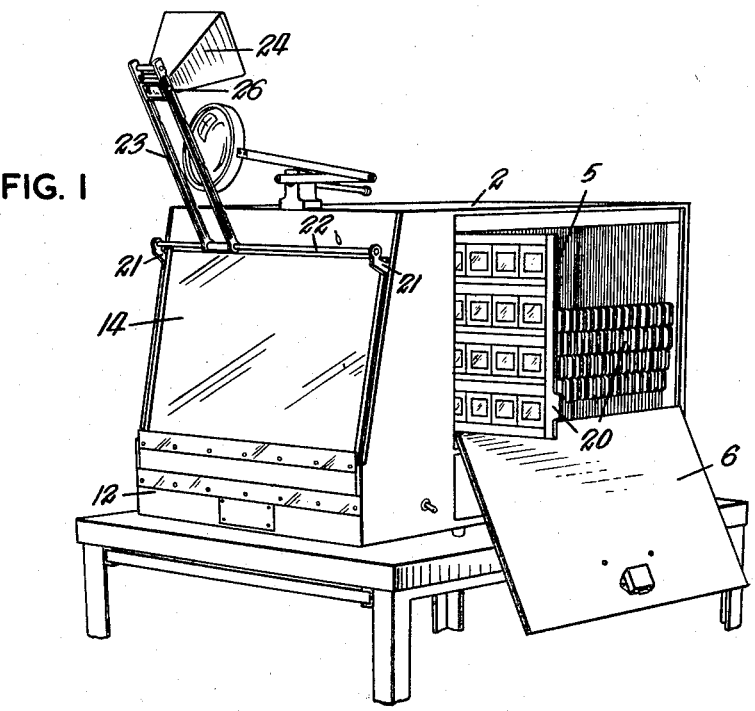
Fig. 1 is a perspective view of the device, showing the transparency magnifier in an upwardly swung position and the cabinet door open.
Figure 2:
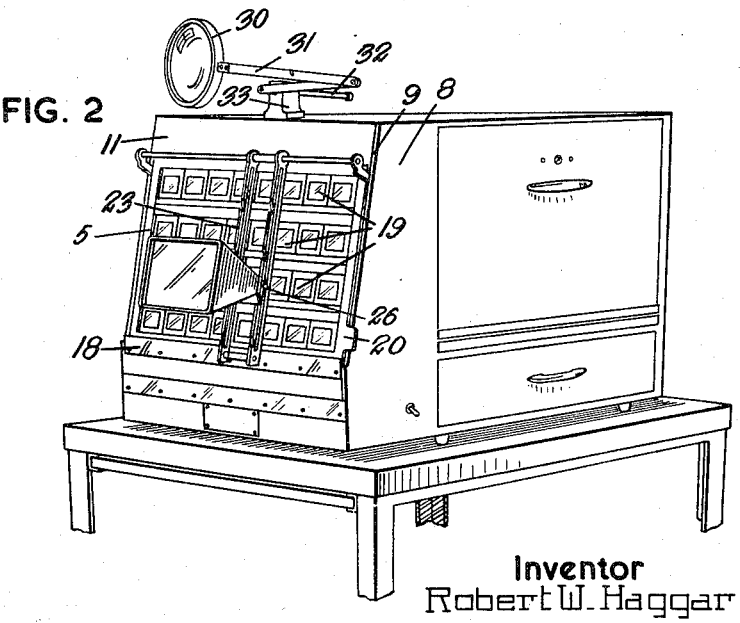
Fig. 2 is a similar view to Fig. 1 and showing a frame of transparencies resting against the translucent face of the illuminated casing and the transparency magnifier positioned in front of the frame.

The rear portion of the cabinet 2 contains two compartments 3 and 4, the compartment 3 being designed for the storage of vertically arranged transparency frames 5 which are removable therefrom through a side door 6. The lower compartment 4 contains a utility drawer 7.

The cabinet is formed with forwardly projecting side extensions 8 having upwardly and rearwardly inclined front edges 9 which in conjunction with the front face 10 of the cabinet constitute a recess for the reception of the illuminated box-like casing 11, which when in position is supported by the top edge of a strip 12 extending between the bottom front edges of the side extensions 8, the casing being inclined upwardly and rearwardly with its upper rear edge resting against the upper portion of the front face 10 of the cabinet and secured in place by a screw 13 threaded through the face and the casing.

The casing 11 is formed with a translucent front face 14 and contains one or more electric light bulbs or tubes 15 which are connected to a flexible electric cable 16 extending from the bottom of the casing receiving recess, the illumination of the casing being controlled by a switch 17. The vertical bottom portion of the front face of the casing, below its inclined translucent front face 14, carries a strip 18 and behind which the bottom edge of a transparency frame 5 is inserted when the frame is positioned to lie against the inclined front face of the casing. The transparencies 19 are removably mounted in rows in the frames 5, the frames carrying identification tabs 20 whereby a desired frame may be readily located in the cabinet.

A transparency magnifier assembly is mounted upon the front of the casing and comprises a pair of lugs 21 projecting therefrom above the top of the translucent face 14 to carry a cross bar 22. A rectangular frame 23 has its upper end swingably and slidably mounted upon the cross bar and is provided to support a magnifier casing 24 containing a magnifying lens 25. The casing 24 carries side pins 26 which slide within slots 27 in the sides of the frame 23, which sides are also formed with notches 28 for the reception of a lip 29 on the casing 24 and whereby the magnifier may be adjustably positioned in height upon the frame. As the frame is slidable upon the bar 22 it will be apparent that the magnifier may be adjusted to a position in front of any desired transparency in a frame resting against the front of the casing 11.

Figure 3:
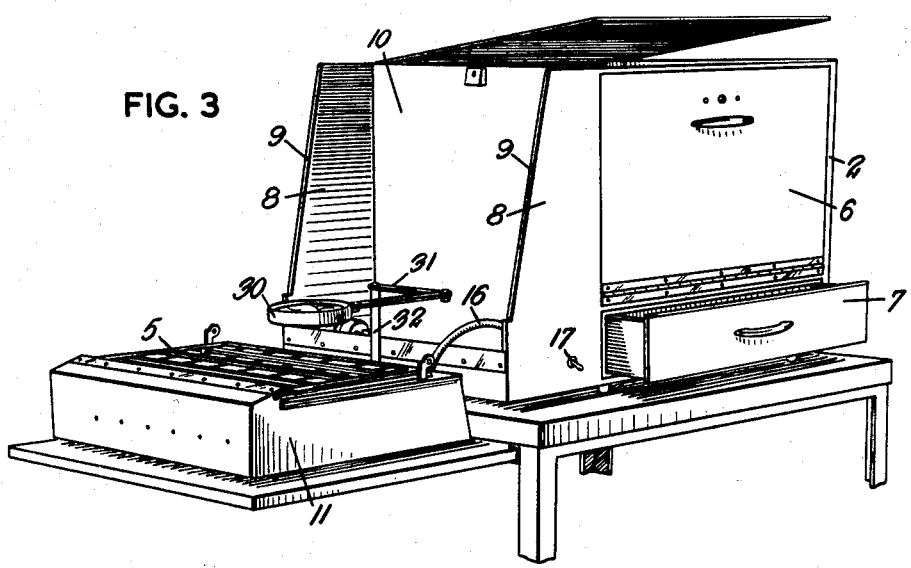
Fig. 3 is also a perspective view of the device and showing the illuminated casing removed from the cabinet and lying upon its back face for convenient use when the transparencies are being mounted in a frame resting on the illuminated translucent face of the casing.
Figure 4:
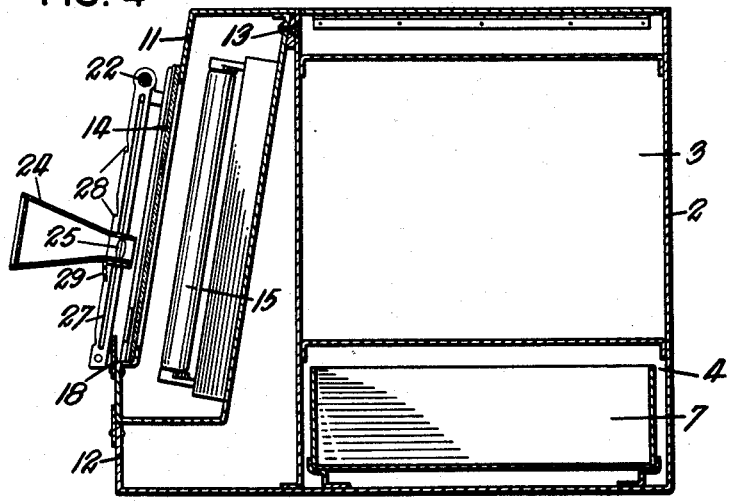
Fig. 4 is a vertical cross-sectional view through the device.

When a batch of transparencies are to be arranged within a frame 5 the casing 11 is removed from its normal position in the cabinet and laid down on its back face as shown in Fig. 3, the casing being illuminated and the frame to be filled positioned over the translucent casing front 14. To facilitate the inspection of transparencies for arrangement a magnifying glass 30 is carried upon the outer end of a jointed arm 31 mounted upon the outer end of a rod 32 slidable within a block 33 upon the top of the casing, the jointed arm 31 being so dimensioned that the magnifying glass may be brought to any desired position.

From the foregoing description it will be apparent that I have devised a very practical unit for storing and viewing transparencies under magnification, and wherein a group of transparencies relating to a particular subject are mounted side-by-side in a frame for immediate study and comparison.

What I claim as my invention is:

1. In a device for selectively viewing a plurality of photographic transparencies which are pre-arranged in fixed position in a movable holding frame, said device including a cabinet, an interiorally illuminated casing having a translucent front face portion of substantially the same area as the frame, said cabinet being formed with forwardly projecting side extensions which form in conjunction with a front face of the cabinet a recess in which the casing is removably contained in an inclined manner, and a stop member carried upon the front of the casing for retaining the frame against sliding down the front face of the casing when the latter is positioned in the recess.

2. A device as claimed in claim 1, wherein a transparency magnifying element is adjustably positioned in front of the translucent portion of the casing and comprising a bar extending across the upper portion of the front of the casing, a frame having its upper portion slidably and pivotally arranged upon the bar, and a casing containing a magnifying lens and mounted for upward and downward slidable movement upon the frame.

References Cited in the file of this patent

UNITED STATES PATENTS

| | | |
|---|---|---|
| 1,576,557 | Strully | Mar. 16, 1926 |
| 1,662,304 | Doogood | Mar. 13, 1928 |
| 1,845,410 | Harding | Feb. 16, 1932 |
| 2,534,561 | Silver | Dec. 19, 1950 |
| 2,656,758 | Cole | Oct. 27, 1953 |
| 2,704,901 | Hulse | Mar. 29, 1955 |
| 2,821,037 | Westphal | Jan. 28, 1958 |

FOREIGN PATENTS

| | | |
|---|---|---|
| 140,402 | Austria | Aug. 15, 1934 |
| 662,745 | Germany | May 23, 1939 |
| 688,951 | Great Britain | Mar. 18, 1953 |
| 1,059,399 | France | Mar. 24, 1954 |